Dec. 25, 1951  R. P. AKEY  2,579,774
VEHICLE SIDE RACK
Filed Nov. 3, 1949
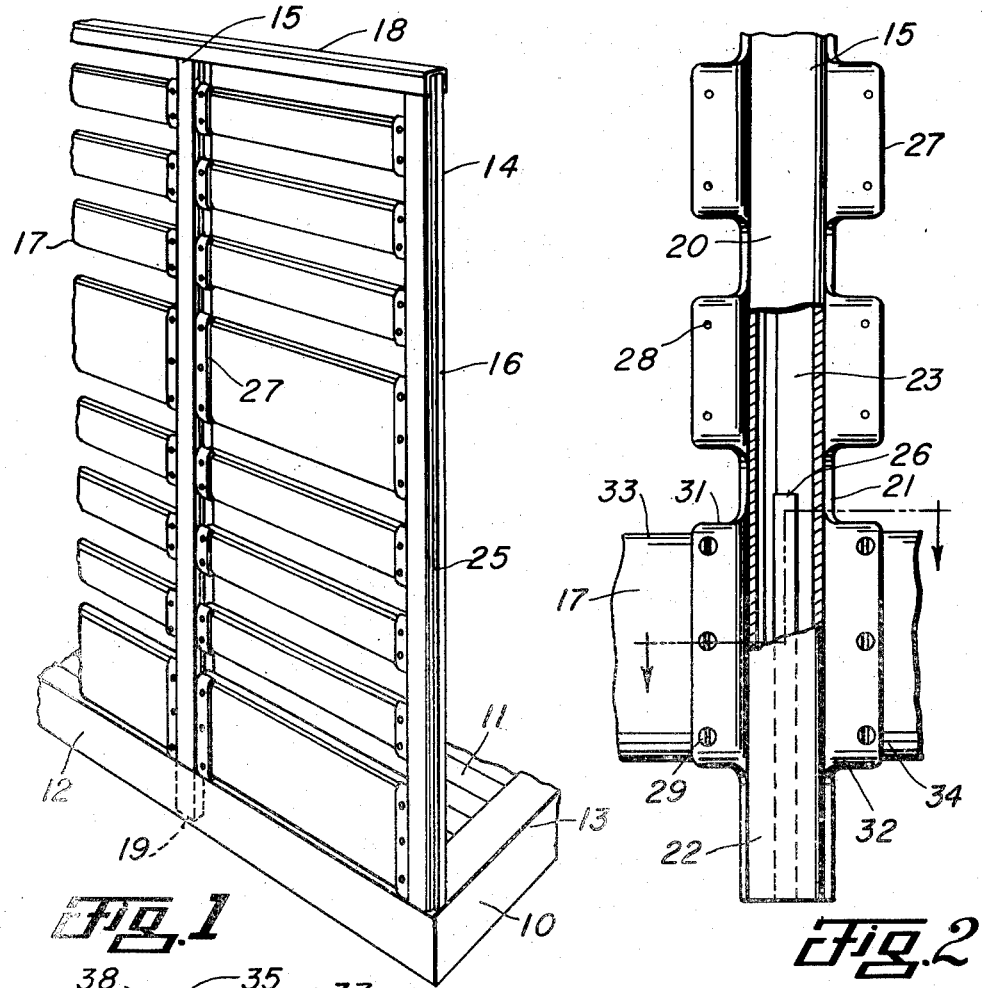
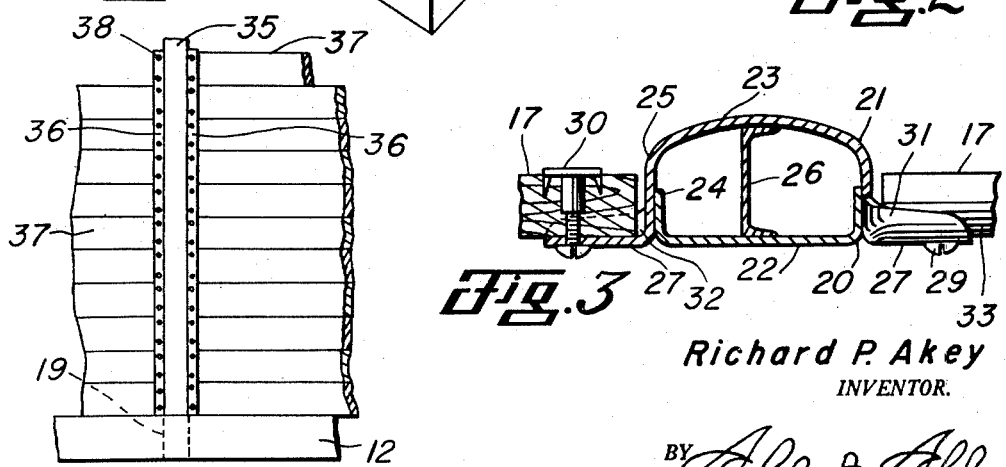
Richard P. Akey
INVENTOR.

Patented Dec. 25, 1951

2,579,774

UNITED STATES PATENT OFFICE 2,579,774

VEHICLE SIDE RACK

Richard P. Akey, Fort Worth, Tex., assignor to Hobbs Manufacturing Company, Fort Worth, Tex., a corporation of Texas Application November 3, 1949, Serial No. 125,263

2 Claims. (Cl. 296—3)

1

This invention relates to new and useful improvements in vehicle side racks and more particularly to the stakes thereof.

One object of the invention is to provide an improved side rack for vehicles, such as trailers and trucks, which is of such construction that the maximum area of the vehicle bed or body is unobstructed without the rack, its stakes or slats projecting beyond the margins of said bed.

Another object of the invention is to provide an improved vehicle side rack having novel uprights for supporting its slats at the margins of the vehicle bed whereby the usable area of said bed is increased and the appearance of the side rack enhanced.

A further object of the invention is to provide an improved stake for a vehicle side rack which is formed of opposed channel members so as to be of hollow, light-weight construction of sufficient rigidity and ruggedness to withstand rough use.

Still another object of the invention is to provide an improved stake, of the character described, having lateral flanges at its external surface for receiving and supporting the ends of slats whereby the slats are disposed adjacent and inwardly of the stake exterior.

A construction designed to carry out the invention will be hereinafter described together with other features of the invention.

The invention will be more readily understood from a reading of the following specification and by reference to the accompanying drawing, wherein examples of the invention are shown, and wherein:

Fig. 1 is a perspective view of a portion of a side rack constructed in accordance with the invention and mounted on a vehicle body, Fig. 2 is a front elevational view, partly in section, of a portion of one of the stakes, Fig. 3 is a horizontal, cross-sectional view, taken on the line 3—3 of Fig. 2, and Fig. 4 is a front elevational view of a portion of a modified side rack.

In the drawing, the numeral 10 designates a portion of the body or bed of a vehicle, such as a trailer or truck, having a floor 11, side rails 12 and end rails 13. Only one side rail and one end rail are shown. A removable side rack 14 is provided for each side of the vehicle and includes a plurality of uprights or stakes 15 and 16 of hollow construction for supporting horizontally-extending, vertically-spaced slats or rails 17 which may be of different widths. The upper ends of the stakes 15 and 16 are connected by an overlying channel member 18 extending longitudinally of the vehicle bed and having said stake upper ends secured therein. The lower ends of the stakes are adapted to engage within suitable sockets or pockets formed in the side rail, as shown by the dotted line 19 in Fig. 1.

Each stake is substantially identical and includes a pair of coextensive channel members 20 and 21 which are welded or otherwise secured one within the other and have their respective webs 22 and 23 in opposed, spaced relation so as to form the outer and inner sides of the stake (Figs. 2 and 3). The outer web 22 is flat, while the inner web 23 is arced or curved transversely outward, whereby the outer side of said stake is flat and its inner side is curved or rounded. The outer channel member has inwardly-directed, relatively narrow flanges 24 which underlie or are disposed internally of outwardly-directed flanges 25 of the inner channel member. Manifestly, the connection of the flanges 24 and 25 secures the channel members to each other and their double thickness increases the rigidity of the stake. If desired, the lower portion of each stake may be reinforced by a channel member 26 extending between and welded or otherwise secured to the intermediate portions of the webs 22 and 23. As shown in Fig. 2, the member 26 preferably extends to the lower end of the stake so as to strengthen the portion of said stake which engages in the side rail pocket.

For receiving and supporting the ends of the slats 17, a plurality of lateral elements 27 in the form of flanges or tongues are made integral with the outer edge portions or margins of the flanges 25. The tongues 27 are spaced vertically in accordance with the desired spacing of the slats and are of a length substantially equal to the width of their respective slats. Openings 28 are formed in the tongues for receiving bolts 29 which extend through the end portions of the slats and are secured thereto by suitable lock nuts 30. It is noted that the tongues 27 are disposed in substantial alinement with the outer web 22 and that the slats are disposed inwardly of said tongues, whereby the outer surfaces of said slats are substantially flush with the outer side of said stakes. Since the stakes are usually of greater thickness than the slats, the inner surfaces of said slats do not project inwardly beyond the inner side of said stakes. As shown by the numerals 31 and 32, the upper and lower edge portions of each tongue are preferably bent inwardly so as to overlie and underlie its slat. It is desirable to round or curve the edge portions 31 and 32 transversely and to provide complementary, bevelled edge portions 33 and 34 on the slats. It is noted that the tongues 27 are omitted from one side of each end stake 16.

In Fig. 4, a slightly modified form of stake 35 is shown. The construction of the stake 35 is substantially identical to the stake 15 with the exception of the tongue 27. Instead of the later, continuous, lateral lips or tongues 36 are formed on each stake 35 and extend longitudinally throughout the length thereof. A row of solid or unspaced slats or rails 37 have their ends disposed inwardly of and secured to the lips 36 by suitable fasteners 38. It is pointed out that the lips are disposed in substantial alinement with the outer side of the stake whereby the outer surfaces of the slats 37 are substantially flush with said outer side. A side rack of this construction functions in substantially the same manner as the open side rack 14 and is supported similarly by the lower end of its stakes engaging within pockets formed in the side rail 12.

Assuming that the vehicle body is of the maximum legal width, it is manifest that the mounting of the stakes in pockets formed in the side rails and the disposition of the slats adjacent the outer side of said stakes make it possible to utilize the maximum area of said vehicle bed. The rounding of the inner side of the stakes eliminates sharp corners which might injure cattle, while the external flush relation of the stakes and slats materially enhances the appearance of the side rack and eliminates objectionable projections.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A vehicle side rack including, a plurality of spaced upright stakes, each stake having a pair of channel members secured one within the other with their webs opposed and forming the inner and outer sides of the stake, the inner channel member having its outwardly directed flanges overlying the inwardly directed flanges of the outer channel member and terminating substantially flush with its outer web, the flanges of the channel members being continuous and uninterrupted, slats extending between the stakes, lateral tongues made integral with the outer portions of the overlying flanges and in substantial alinement with the outer web, and fastening means connecting the end portions of the slats to the inner surfaces of the tongues with the end faces of said slats in abutting relation to said overlying flanges, whereby said slats are disposed between the inner and outer sides of said stakes and have their outer surfaces substantially flush with said outer sides.

2. A vehicle side rack including, a plurality of spaced upright stakes, each stake having a pair of channel members secured one within the other with their webs opposed and forming the inner and outer sides of the stake, the inner channel member having its outwardly directed flanges overlying the inwardly directed flanges of the outer channel member and terminating substantially flush with its outer web, the flanges of the channel members being continuous and uninterrupted, slats extending between the stakes, and lateral tongues made integral with the outer edge portions of the overlying flanges and in substantial alinement with the outer web for receiving and supporting the slats inwardly of the tongues with the outer surfaces of said slats substantially flush with the outer sides of the stakes, the inner web of each stake being bowed transversely whereby the inner side of the stake is substantially convex.

RICHARD P. AKEY.

REFERENCES CITED

The following references are of record in the file of this patent:

UNITED STATES PATENTS

| Number | Name | Date |
| --- | --- | --- |
| 319,277 | Lesher | June 2, 1885 |
| 1,631,118 | Burkart | June 7, 1927 |
| 2,040,307 | Hart | May 12, 1936 |
| 2,427,937 | Willson | Sept. 23, 1947 |
| 2,438,428 | Birdsall | Mar. 23, 1948 |